United States Patent
Jundt et al.

(10) Patent No.: US 7,153,487 B2
(45) Date of Patent: *Dec. 26, 2006

(54) USING CONDENSED CHEMICALS TO PRECONDITION LITHIUM NIOBATE AND LITHIUM TANTALATE CRYSTALS

(75) Inventors: Dieter Hans Jundt, Palo Alto, CA (US); Maria Claudia Custodio Kajiyama, San Jose, CA (US); Jason Louis Spitzer, San Jose, CA (US)

(73) Assignee: Crystal Technology, Inc., Palo Alto, CA (US)

( * ) Notice: Subject to any disclaimer, the term of this patent is extended or adjusted under 35 U.S.C. 154(b) by 237 days.

This patent is subject to a terminal disclaimer.

(21) Appl. No.: 10/854,536

(22) Filed: May 25, 2004

(65) Prior Publication Data

US 2005/0265916 A1 Dec. 1, 2005

(51) Int. Cl.
- B05D 3/02 (2006.01)
- C01D 15/00 (2006.01)
- C01G 33/00 (2006.01)
- C01G 35/00 (2006.01)

(52) U.S. Cl. .............. 423/594.8; 423/594.15; 252/62.9 R; 117/3; 117/95; 117/900; 427/372.2; 427/374.1; 427/398.1; 427/240; 427/430.1; 204/192.1

(58) Field of Classification Search .......... 423/594.8, 423/594.15; 252/62.9 R; 117/95, 900, 3; 427/372.2, 374.1, 398.1, 240, 430.1; 204/192.1
See application file for complete search history.

(56) References Cited

U.S. PATENT DOCUMENTS

| | | | | |
|---|---|---|---|---|
| 3,998,687 A | * | 12/1976 | Ballman et al. | 117/66 |
| 4,108,970 A | * | 8/1978 | Ballman et al. | 423/594.8 |
| 4,135,963 A | * | 1/1979 | Fukuda | 117/13 |
| 5,209,917 A | * | 5/1993 | Ohno et al. | 423/594.8 |
| 6,051,062 A | | 4/2000 | Kawaguchi et al. | |
| 6,319,430 B1 | | 11/2001 | Bordui et al. | |
| 6,673,330 B1 | * | 1/2004 | Kitamura et al. | 423/594.8 |
| 6,932,957 B1 | | 8/2005 | Miles et al. | |
| 2004/0255842 A1 | | 12/2004 | Kajigaya | |

FOREIGN PATENT DOCUMENTS

| | | |
|---|---|---|
| JP | 2004254.1.14 | 9/2004 |
| JP | 2004269300 | 9/2004 |
| WO | WO/2004/002891 | 1/2004 |
| WO | WO 2004/030046 A1 | 4/2004 |
| WO | WO 2004/030047 A1 | 4/2004 |

OTHER PUBLICATIONS

E. Kaldis, "Current Topics In Materials Science", vol. 1, North Holland Publishing Company, Switzerland, 1978, pp. 481-601.

(Continued)

*Primary Examiner*—Timothy C. Vanoy
(74) *Attorney, Agent, or Firm*—David H. Jaffer; Pillsbury Winthrop Shaw Pittman LLP

(57) ABSTRACT

Methods and apparatus for preconditioning a lithium niobate or lithium tantalate crystal. At least a portion of a surface of the crystal is covered with a condensed material including one or more active chemicals. The crystal is heated in a non-oxidizing environment above an activating temperature at which the active chemicals contribute to reducing the crystal beneath the covered surface portion. The crystal is cooled from above the activating temperature to below a quenching temperature at which the active chemicals become essentially inactive for reducing the crystal.

24 Claims, 2 Drawing Sheets

OTHER PUBLICATIONS

David A. Dutt et al., "*Optical Absorption And Electron Paramagnetic Resonance Studies Of Chemically Reduced Congruent Lithium Niobate*", Journal of Physics and Chemistry Of Solids, vol. 51, No. 5, Jun. 1990, pp. 407-415.

Ajay Dhar et al., "*Optical Properties Of Reduced Lithium Niobate Single Crystals*", Journal of Applied Physics, vol. 68, No. 11, Dec. 1990, pp. 5804-5809.

Ajay Dhar et al., "*On The Correlation Between Optical And Electrical Properties In Reduced Lithium Niobate Crystals*", Journal of Physics D Applied Physics, vol. 24, Sep. 1991, pp. 1644-1648.

G. Bergmann, "*The Electrical Conductivity of $LiNbO_3$*", Nov. 1967, Solid State Communications, vol. 6., 1968, pp. 77-79.

Stephen G. Boyer et al., "*Investigation Of The Nb-Rich Phase Boundary Of $LiNbO_3$, Ceramics And Inorganic Crystals For Optics, Electro-Optics, Electro-Optics, And Nonlinear Conversion*", Proceeding SPIE vol. 968, Aug. 1988, pp. 73-80.

A.M. Glass et al., "*Optical Index Damage In Electrooptic Crystals*", NBS Special Publication No. 372, Laser Induced Damage In Optical Materials, 1972, pp. 15-26.

Paul J. Jorgensen, "*High Temperature Transport Processes In Lithium Niobate*", The Journal of Physics and Chemistry of Solids, vol. 30, No. 11, 1969, pp. 2639-2648.

A.B. Sherman, "*Absorption Of Elastic Waves In Reduced $LinbO_3$*", Soviet Physics Solid State, vol. 13, No. 6, Dec. 1971, pp. 1413-1415.

Bor-Uei Chen et al., "*Elimination Of $Li_2O$ Out-Diffusion Waveguide In $LiNbO_3LiTaO_3$*", Applied Physics Letters, vol. 30, Jun. 1977, pp. 570-571.

D.H. Jundt et al., "*Composition Dependence Of Lithium Diffusivity In Lithium Niobate At High Temperature*", Journal Of Applied Physics, vol. 72, No. 8, Oct. 1992, pp. 3468-3473.

P.F. Bordui et al., "*Chemically Reduced Lithium Niobate Single Crystals: Processing Properties And Improved Surface Acoustic Wave Device Fabrication And Performance*", Journal Of Applied Physics, vol. 85, No. 7, Apr. 1999, pp. 3766-3769.

G. Bergmann, "*The Electrical Conductivity of $LiNbO_3$*", Nov. 1967, Solid State Communications, vol. 6., 1968, pp. 77-79.

Rauber, A., "Chemistry and Physics of Lithium Niobate," Current Topics in Materials Science, E. Kaldis, p. 481-601, (1978).

Sherman, A.B., et al., "Absorption of Elastic Waves in Reduced LiNbO3," Soviet Phys-Solid State, vol. 13 (No. 6), p. 1413-1415, Dec. 1971.

* cited by examiner

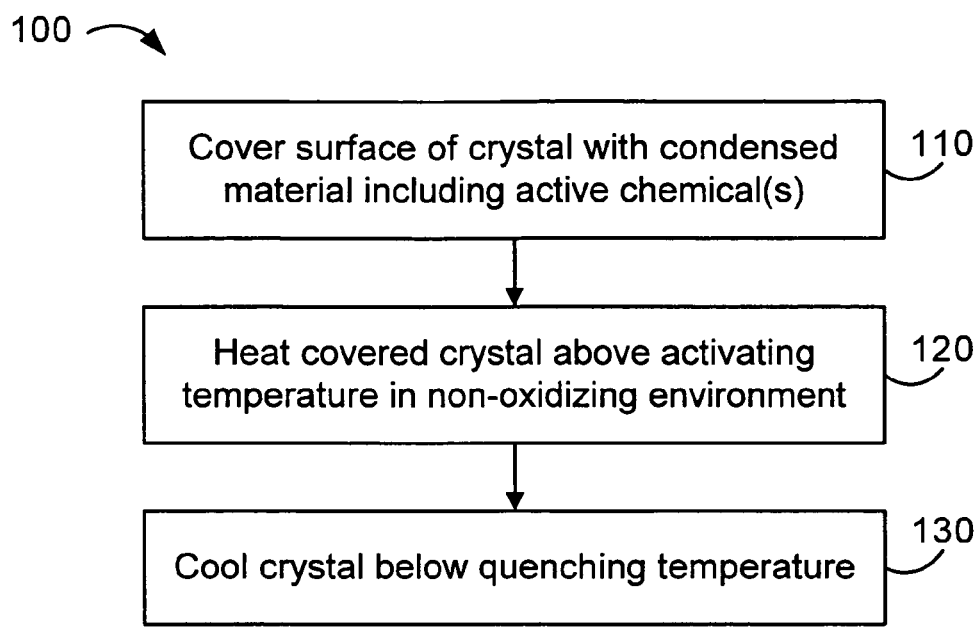
FIG. 1
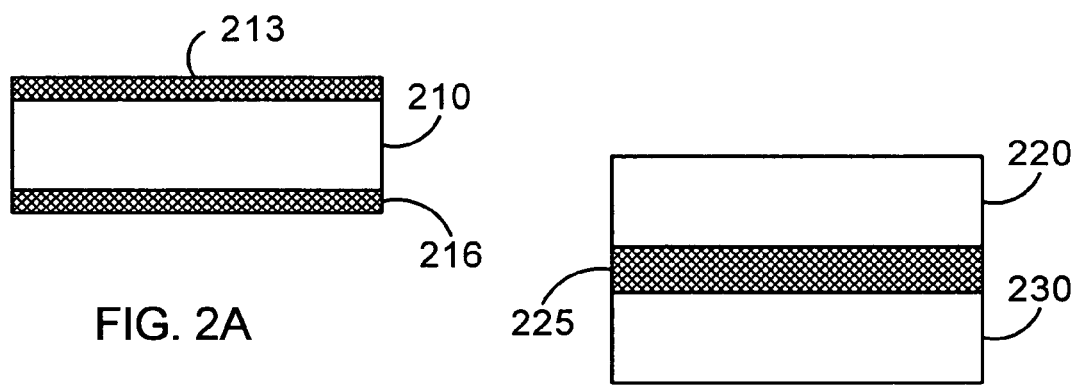
FIG. 2A
FIG. 2B
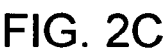
FIG. 2C

USING CONDENSED CHEMICALS TO PRECONDITION LITHIUM NIOBATE AND LITHIUM TANTALATE CRYSTALS

BACKGROUND

The present application relates to preconditioning lithium niobate and lithium tantalate crystals.

Lithium niobate ($LiNbO_3$, "LN") and lithium tantalate ($LiTaO_3$, "LT") single crystals show a variety of interesting and useful physical properties. At room temperatures, LN and LT crystals have a ferroelectric order that is a spontaneous electric polarization. The LN and LT crystals also show strong electro-optic coupling, pressure-electricity coupling called piezoelectric effect, and temperature-electricity coupling called pyroelectric effect.

LN and LT crystals are used in many electronic, optical, and electro-optical devices, such as surface acoustic wave filters or other frequency filters, optical modulators, electro-optical switches, or detectors using piezoelectric or pyroelectric effects. While a particular property of an LN or LT crystal may be useful for one application, the same property can have undesired effects in another application or under certain conditions. For example, a pressure sensor and a heat detector take advantage of the piezoelectric and pyroelectric effects, respectively. However, if the crystal is subject to excessive mechanical stress or temperature changes during manufacturing or operation, the piezoelectric and pyroelectric effects can build up electric charges on the surface of the crystal. The built up charges decay slowly, typically in the order of several hours, and can interfere with the operation of the device or even damage the device by triggering electric sparks. Such undesired effects can be minimized by preconditioning the crystals.

In one preconditioning technique, a LN or LT crystal is chemically reduced by heating the crystal in a reducing atmosphere. On the surface of the crystal, electric charges decay at a higher rate after the reduction than without preconditioning. To accelerate the charge decay, the crystal's reduction can be increased by increasing the temperature or the duration of the heating during preconditioning. If the decay rate is high enough, surface charges cannot build up to a level that would damage the operation of a device including the reduced crystal.

SUMMARY

A lithium niobate or lithium tantalate crystal is preconditioned in a non-oxidizing atmosphere using active chemicals in a condensed material covering at least a portion of a surface of the crystal. In this application, "condensed material" and "condensed chemical" refer to a material and a chemical in a non-gaseous state, independent of whether the material and the chemical have gone through condensation or not. Thus solid or liquid materials are referred to as condensed materials independent of how the solid or liquid materials have been prepared. Exemplary condensed materials include crystals, powders, solutions, dispersions and gels.

In general in one aspect, the invention provides methods and apparatus for preconditioning a lithium niobate or lithium tantalate crystal. At least a portion of a surface of the crystal is covered with a condensed material including one or more active chemicals. The crystal is heated in a non-oxidizing environment above an activating temperature at which the active chemicals contribute to reducing the crystal beneath the covered surface portion. The crystal is cooled from above the activating temperature to below a quenching temperature at which the active chemicals become essentially inactive for reducing the crystal.

Particular implementations can include one or more of the following features. Reducing the crystal can include reducing the crystal by a reducing reaction in which one or more of the active chemicals participate. The reducing reaction can include multiple chemical reactions and at least one active chemical can participate in one of the multiple chemical reactions. The crystal's reduction can be accelerated by the active chemicals. The crystal can be a crystal wafer.

One or more active chemicals can be selected from the group consisting of sodium bicarbonate, potassium carbonate, calcium carbonate, calcium hydride, magnesium carbonate, lithium hydride and lithium carbonate, and combinations thereof. For example, one or more active chemicals can include sodium bicarbonate, calcium hydride, lithium hydride, or lithium carbonate. Or one or more active chemicals can include lithium hydride or lithium carbonate, for example, lithium hydride. The one or more active chemicals can include a hydride, such as lithium hydride or calcium hydride. Or one or more active chemicals can include a carbonate, such as lithium carbonate, potassium carbonate, calcium carbonate, or magnesium carbonate.

Covering the surface portion with a condensed material can include covering the surface portion with a condensed material including an inactive component that does not contribute to reducing the crystal at the activating temperature. Covering the surface portion with a condensed material can include depositing the condensed material by condensation onto the surface portion. Depositing the condensed material by condensation onto the surface portion can include depositing the condensed material during the heating of the crystal in the non-oxidizing environment. Covering the surface portion with a condensed material can include depositing a thin film of the condensed material onto the surface portion. Depositing the thin film can include physical vapor deposition of the condensed material onto the surface portion. Depositing the thin film can include spin coating the surface portion with the condensed material. Depositing the thin film can include dip coating the surface portion with the condensed material. Covering the surface portion with a condensed material can include covering the surface portion with a powder of the condensed material. Covering the surface portion with a condensed material can include preparing a solution or dispersion by dissolving or dispersing the active chemicals in a liquid matrix, respectively, and spinning the solution or dispersion onto the surface portion.

Heating the crystal above an activating temperature can include heating the crystal to a temperature that is below a ferroelectric phase transition temperature of the crystal. Heating the crystal above an activating temperature can include heating the crystal above about 250 Celsius. Heating the crystal in a non-oxidizing environment can include heating the crystal in a reducing atmosphere or an inert atmosphere. Heating the crystal above an activating temperature can include keeping the crystal above the activating temperature during a predetermined activating time. The activating time can be determined based on the active chemicals in the condensed material. Cooling the crystal from above the activating temperature below a quenching temperature can include cooling the crystal from above the activating temperature below a quenching temperature within a quenching time that is substantially smaller than the activating time.

The invention can be implemented to realize one or more of the following advantages. By applying condensed chemicals on the surface of a LN or LT crystal, reduction of the crystal can be substantially accelerated compared to a reduction that uses only a reducing atmosphere. The crystal can be reduced at a relatively low temperature. In particular, LT crystals can be effectively reduced below the ferroelectric transition temperature. Therefore, the crystals may not need to be poled during or after the reduction. The crystal can be reduced using non-toxic chemicals that are stable at temperatures used during the reduction. The crystal can be reduced in either a reducing or an inert atmosphere. Entire grown crystals and crystal wafers can be effectively reduced. Alternatively, the reduction can be limited to selected portions of a wafer. The crystal can be reduced using simple technologies. For example, the crystal can be covered with a powder including the active chemicals, or the active chemicals can be dissolved or dispersed in a liquid matrix and the solution or dispersion spun onto the crystal. Alternatively, the chemicals can be deposited on the crystal by dip coating, spin coating or by physical vapor deposition such as sputtering or evaporation.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIG. 1 is a schematic flow diagram illustrating a method for preconditioning LN and LT crystals.

FIGS. 2A–2C are schematic diagrams illustrating exemplary crystals covered with condensed chemicals.

Like reference numbers and designations in the various drawings indicate like elements.

DETAILED DESCRIPTION

Figure 3:
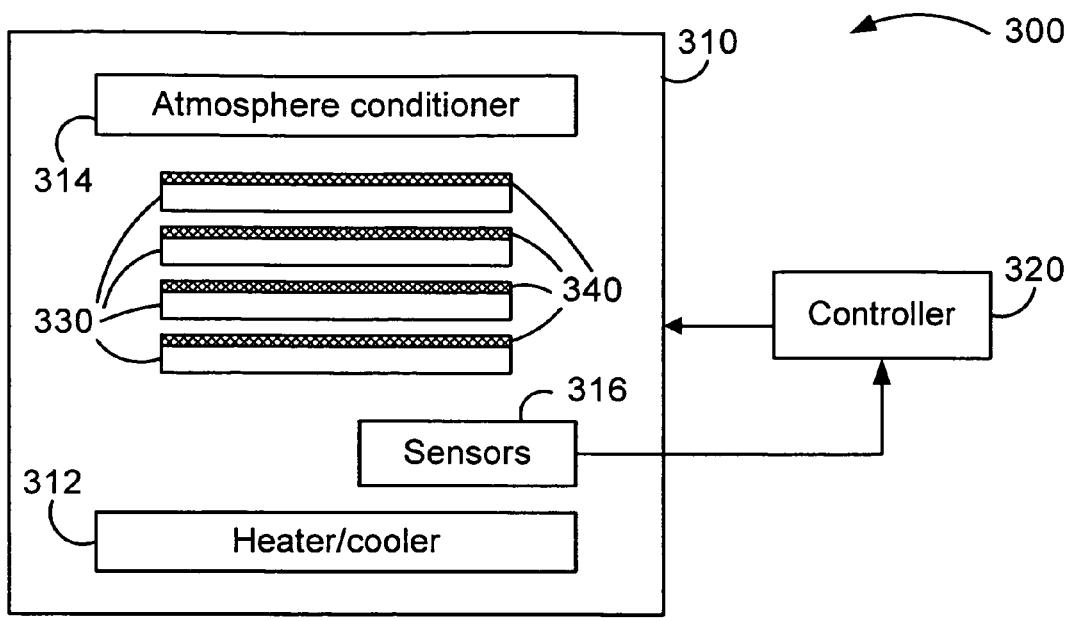
FIG. 3 is a schematic diagram illustrating a system for preconditioning LN and LT crystals.

FIG. 1 illustrates a method 100 for preconditioning a LN or LT crystal to increase a decay rate of electric charges on a surface of the crystal. The LN or LT crystal can be grown, for example, by the Czochralski technique (Current Topics in Material Science, Vol. 1, p. 545, edited by E. Kaldis, North Holland Publishing Co., 1978). The method 100 can be performed using an entire grown crystal or a pre-cut crystal, such as a crystal wafer.

Optionally, the LN or LT crystal can be pre-processed before performing the method 100. For example, the crystal surface can be as-cut, lapped, etched, or polished or the crystal can be poled or un-poled. As-cut surface refers to a crystal surface that results from a mechanical shaping or slicing operation. The general surface finishing process may include processing steps such as lapping, etching and mirror polishing. These processing steps can be performed using conventional chemical mechanical techniques. The crystal can be polished using conventional chemical mechanical polishing systems. Poling of the crystal can be performed by heating the crystal above a ferroelectric transition temperature (also called Curie temperature Tc, which is about 600 Celsius for LT, and about 1140 Celsius for LN crystals) where the crystal loses ferroelectric order. The crystal is then cooled below the transition temperature in an electric field that sets an orientation for the ferroelectric order. Thus the electric field aligns the ferroelectric poles of the crystal.

At least a portion of the surface of the crystal is covered with a condensed material including one or more active chemicals (step 110). The condensed material can be in a solid or a liquid phase. In one implementation, the condensed material is deposited on the surface of the crystal as a thin film. For example, the condensed material can be applied to the crystal's surface by dip coating, spin coating or physical vapor deposition. In one implementation, the condensed material is deposited on a particular portion of the crystal's surface, for example, after covering the surface of the crystal with a mask patterned to define the particular surface portion. Alternatively, the condensed material can be a powder that covers a surface of the crystal.

For depositing a film on the crystal's surface, the active chemicals can be dissolved or dispersed in a liquid matrix. In one implementation, the liquid matrix is relatively inert, gas permeable and has a viscosity that can be adjusted to achieve uniform suspension of the active chemicals or to optimize a spin-on process used to cover the crystal's surface. For example, the film can be deposited using a gas permeable spin-oh glass such as ACCUGLASS®125T-12B available from Honeywell Electronic Materials of Sunnyvale, Calif. This matrix may be uniformly applied in a mass production setting using established spin-coating and thermal curing methods.

The condensed material includes active chemicals that contribute to reducing the crystal. The condensed material can also include inert components. For example, the active chemicals can be dissolved in an inert solvent, and the solution can be spun on the surface of the crystal. Or the active chemicals can be dispersed in a liquid matrix, and the dispersion deposited on the surface of the crystal. Exemplary crystals covered with condensed active chemicals, and suitable choices for the active chemicals, are discussed with reference to FIGS. 2A–2C.

The covered crystal is heated in a non-oxidizing environment above an activating temperature (step 120). The crystal can be heated using a heating apparatus, such as a furnace discussed below with reference to FIG. 3. In one implementation, the crystal is heated above the activating temperature in a non-oxidizing atmosphere that is an inert or reducing atmosphere. Alternatively, the crystal can be heated in vacuum.

In one implementation, before being heated in the heating apparatus, the crystal is already covered with the condensed material that includes active chemicals for reducing the crystal. Alternatively, the crystal can be heated above the activating temperature first, and the active chemicals can go through condensation to form the condensed material on the heated crystal. For example, the active chemicals can be placed in the heating apparatus near the crystal, and as the temperature rises, the active chemicals can evaporate and the vapor can go through condensation to form the condensed material on the crystal's surface.

Above the activating temperature, the active chemicals contribute to chemically reducing the crystal beneath the surface covered with the condensed material. For example, the active chemicals can participate in a reducing reaction that chemically reduces the crystal. The reducing reaction can include a series of chemical reactions, and the active chemical can participate in one or more of the chemical reactions. The active chemicals can participate directly or indirectly in a reaction that reduces the crystal. For example, the active chemicals can participate in a reaction whose reaction product reduces the crystal, or the reaction product can interact with the reducing atmosphere to reduce the crystal. The active chemicals can also act as catalyzers that, without being chemically changed, accelerate the crystal's reduction.

In general, the term reduction refers to gaining electrons, and the term oxidation refers to removing electrons. For example, removing oxygen from a material may reduce one or more components of the material. For LN or LT crystals, details of the reduction mechanism are still debated. The reduced crystals, however, show a number of characteristic features due to the reduction.

Reduction changes the optical properties of LN or LT crystals. Without reduction, the crystal is transparent in visible light. With increasing degree of reduction, the crystal becomes more and more opaque and darker. That is, optical transmission decreases in the reduced crystal. Without being bound by any particular theory, the decrease in optical transmission might be due to an emerging absorption band centered at about 2.48 eV (H. Jhans et al, J. Phys. C: Solid State Phys., vol. 19 (1986), pp. 3649–3658, incorporated herein by reference).

The changes in optical properties are accompanied by changes in electric properties of the crystal. With increasing degree of reduction, the electric conductivity increases in the crystal, and electric charges inside the crystal can compensate electric charges on a surface of the crystal. Therefore, surface charges decay faster with increasing degree of reduction of the crystal. In an appropriately reduced crystal, surface charges decay at a rate that prevents unwanted build up of electric charges on the surface of the crystal.

The crystal's degree of reduction depends on a processing temperature to which the crystal is heated and a duration of the heating. In general, the higher the processing temperature and the longer the duration of the heating, the larger the degree of reduction. In addition, the degree of reduction is also influenced by properties of the crystal and the active chemicals. Selecting appropriate duration and temperature for the heating is discussed in detail below with reference to FIG. 4 and Table 1.

After keeping the crystal above the activating temperature for an activation period of time, the crystal is cooled below a quenching temperature (step 130). Below the quenching temperature, redox reactions that are chemical reactions involving reduction or oxidation become essentially inactive in normal atmosphere.

FIGS. 2A–2C illustrate exemplary crystals 210, 220, 230 and 240 that have one or more surfaces covered with a condensed material including active chemicals. The crystal 210, 220, 230 or 240 can be an LN or LT crystal, such entire grown crystals or wafers.

In FIG. 2A, the crystal 210 has two surfaces that are covered by a first film 213 and a second film 216, respectively. As discussed above with reference to FIG. 1, the first 213 and second 216 films can be deposited on the crystal's surface by dip coating, spin coating or physical vapor deposition such as sputtering or evaporation.

In FIG. 2B, the crystals 220 and 230 face each other. Between the two crystals, a condensed material 225, such as a powder or solid disc, is juxtaposed so that each of the crystals 220 and 230 has at least one surface that is covered by the condensed material 225. Alternatively, the condensed material 225 can be deposited on one of the crystals 220 and 230, and the other crystal can be positioned to be in contact with the condensed material 225.

In FIG. 2C, the crystal 240 has a single surface that is covered by a condensed material 245. The condensed material 245 can be deposited on the crystal's surface by dip coating, spin coating, physical vapor deposition or any other technique. Alternatively, the condensed material 245 can include a powder or other solid material.

The condensed materials 213, 216, 225 and 245 include active chemicals. The active chemicals contribute to, for example participate in or accelerate reactions that reduce the LN or LT crystals. In one implementation, the active chemicals include reducing agents that are materials that typically become oxidized (that is, lose electrons) in chemical reactions. Examples of reducing agents include hydrides, such as lithium hydride (LiH) or calcium hydride ($CaH_2$), which effectively reduce LT crystals as discussed below with reference to Table 1. Other hydrides, such as aluminum hydride ($AlH_3$) or lithium-aluminum hydride ($LiAlH_4$) can also be used for reducing LN or LT crystals.

In alternative implementations, the active chemicals can include carbonates, such as lithium carbonate ($Li_2CO_3$), potassium carbonate ($K_2CO_3$), calcium carbonate ($CaCO_3$), and magnesium carbonate ($MgCO_3$). The active chemicals can also include bicarbonates, such as sodium bicarbonate ($NaHCO_3$). The reducing capabilities of different active chemicals are discussed below with reference to Table 1. The condensed material can also include combinations of the various active chemicals.

Appropriate active chemicals for the condensed material can be selected based on reducing capabilities or other properties of the chemicals. For example, a chemical can be selected based on physical properties that allow simple processing techniques or provide uniform contact with the surface of the crystal. Furthermore, advantageous chemicals can include chemicals that are non-toxic or do not decompose at processing temperatures.

FIG. 3 shows a system 300 for preconditioning LN or LT crystals. The system 300 includes a furnace 310 and a controller 320 that controls the furnace 310. The furnace 310 can receive multiple LN or LT crystals 330. Each of the crystals 330 has a surface that is covered with a condensed material 340, as discussed with reference to FIG. 2C. The condensed material 340 includes active chemicals that contribute to reducing the crystals 330.

The furnace 310 includes a heater/cooler element 312, an atmosphere conditioner 314, and one or more sensors 316. The heater/cooler element 312 can be used to heat or cool the crystals 330. The atmosphere conditioner 314 can be used to set and maintain properties of the atmosphere inside the furnace 310. In one implementation, the atmosphere conditioner 314 can set and maintain a non-oxidizing atmosphere inside the furnace 310. For example, the atmosphere conditioner 314 can replace the atmosphere inside the furnace with a preset gas mixture at a permanent rate. The non-oxidizing atmosphere can be a reducing atmosphere, such as a gas mixture including inert and hydrogen gases, or an inert atmosphere including only inert gases, such as argon or nitrogen. The one or more sensors 316 can detect temperature and/or chemical properties of the atmosphere inside the furnace 310. The sensors 316 transmit the detected temperature and chemical properties to the controller 320.

During preconditioning the crystals 330, the controller 320 controls the operation of the furnace 310. The controller 320 can control the heater/cooler element 312 or the atmosphere conditioner 314, or both. Based on user input or the properties detected by the sensors 316, the controller can set an appropriate atmosphere or schedule for the heating and cooling during the reduction of the crystals 330. In alternative implementations, the furnace can be controlled manually, without a controller.

Figure 4:
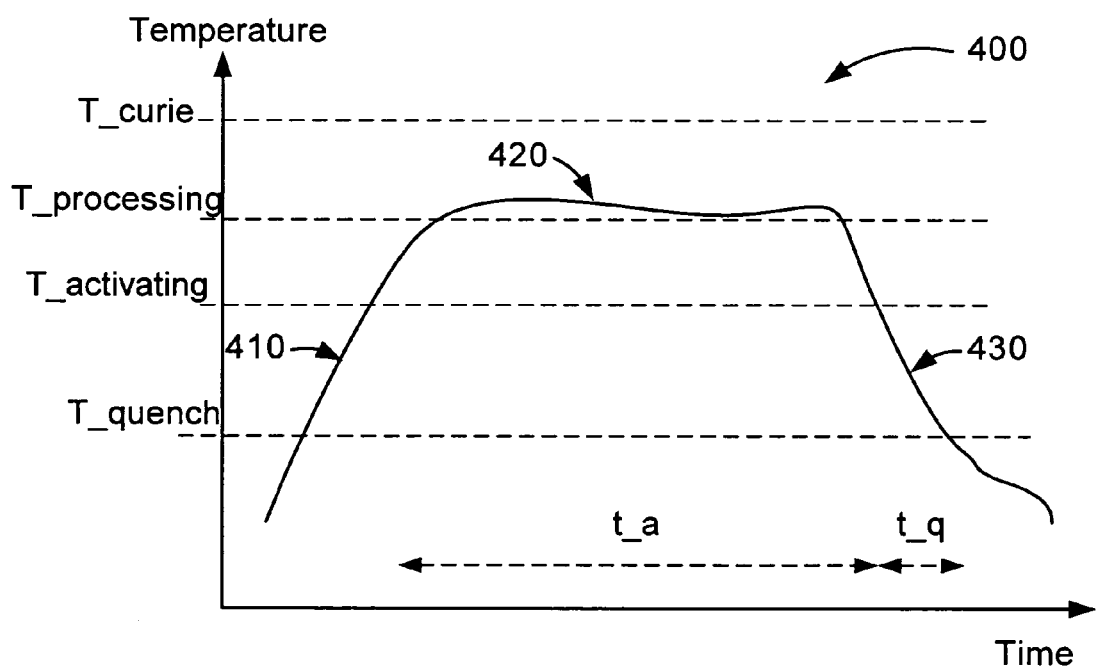
FIG. 4 is a schematic diagram illustrating temperature changes during preconditioning LN and LT crystals.

FIG. 4 illustrates an exemplary heating/cooling recipe graph 400 for preconditioning a crystal using the system 300 (FIG. 3). The crystal is covered with a condensed material that includes one or more active chemicals. The graph 400 illustrates the temperature of the crystal as a function of time. The graph 400 specifies a heating/cooling recipe that can be used during the heating and cooling steps of the method 100 (FIG. 1).

The recipe graph 400 defines a heating-up portion 410, an activated portion 420, and a cooling portion 430. During the heating up portion 410, the temperature of the crystal rises from below to above the activating temperature ("T_activating") at a substantially constant rate. Typically, the rate of the temperature rise is between about 5 Celsius per minute and about 10 Celsius per minute. Alternatively, the temperature can rise slower or faster, or can have a varying rate without substantially affecting the result of the preconditioning.

In the activated portion 420, the temperature of the crystal remains above the activating temperature, where the condensed chemicals become activated and contribute to, for example, participate in chemically reducing the crystal under the surface covered with the active chemicals. The activating temperature can depend on the active chemicals. For example, the activating temperature is below 250 Celsius for active chemicals including lithium hydride and about 400 Celsius for active chemicals including calcium hydride.

During most of the activated portion 420, the temperature of the crystal remains at a processing temperature ("T_processing"). The processing temperature can be chosen to be below a ferroelectric transition temperature ("T_curie") of the crystal. For example, if the crystal is poled, the processing temperature can be sufficiently below the ferroelectric transition temperature so that the crystal does not require a new poling procedure due to the reduction. In particular, an LT crystal has a transition temperature about 600 Celsius. A poled LT crystal can be effectively reduced using chemicals, such as lithium hydride or calcium hydride, for which an activating temperature is well below 600 Celsius. Alternatively, the processing temperature can be above the transition temperature, and the crystal can be poled during or after the reduction.

In the activated portion 420, temperature is kept above the activating temperature for an activation time ("t_a"). Typically, the activation time is in the order of a few hours. For a given processing temperature, the activation time can be chosen to achieve a desired degree of reduction of the crystal. The degree of reduction can be monitored by measuring an optical transmission or an electric conductivity of the reduced crystal. Alternatively, an optimal activation time can be estimated by comparing degrees of reduction for different activation times. Or the activation time can specify a fixed duration, such as five hours, and an optimal processing temperature can be chosen to achieve the desired degree of reduction. The optimal activation time or processing temperature also depends on the active chemicals covering the crystal.

In the cooling portion 430, the temperature is decreased from above the activating temperature to below a quenching temperature ("T_quench"). For LN and LT crystals, the quenching temperature is about 100 Celsius. In one implementation, the cooling time ("t_q") is much shorter than the activation time. Alternatively, the cooling time can be comparable to or longer than the activation time. Below the quenching temperature, the crystal is not reduced or oxidized in normal atmosphere, which is an oxidizing atmosphere. Thus the crystal can be safely removed from the furnace without altering the effect of the reduction. Alternatively, the normal atmosphere can be introduced in the furnace before the crystal is cooled below the quenching temperature. Although some reoxidation may happen in the normal atmosphere, the crystal can still remain reduced if it is quickly cooled below the quenching temperature.

Table 1 shows results of a series of experiments that were performed to reduce LT crystals using condensed active chemicals. In these experiments, LT wafers were covered with a film including the active chemicals. The film was deposited on the wafers using a dispersion of the corresponding active chemical. The coated wafers were heated to a processing temperature between 250 Celsius and 580 Celsius in an atmosphere including included 3.5% $H_2$ and 96.5% $N_2$. After being heated to the corresponding process time between about 5 and 6 hours, the LT wafers were cooled to room temperature and their optical transmission and resistivity were measured.

Without reduction, the LT wafers are transparent, and they become progressively darker with increasing degree of reduction. Thus in general, the less the optical transmission, the more the LT wafer is reduced. However, the optical transmission is also influenced by spatial inhomogeneities of the reduction across the LT wafer. Such inhomogeneities have less effect for small volumes, and become more pronounced when a larger volume such as the whole wafer thickness is considered after a reduction using condensed chemicals on a surface of the wafer. Typically, the wafer is most reduced near the surface covered with the condensed chemicals, and less reduced in the bulk away from the surface. Thus a shallow reduction may generate a dark wafer with small optical transmission without reducing the bulk of the wafer. The actual reduction profile depends on the details of the reduction process. For example, a shallow reduction may be a result of a low processing temperature. In table 1, the optical transmissions are shown in percentage relative to optical transmission of the unreduced crystal, which has a 100% transmission in these units.

The resistivities were measured across the wafers at room temperature in a dark room. Although in a different way than for the optical transmissions, the resistivities are also influenced by the spatial inhomogeneities of the reduction across the wafer. While the optical transmission is typically dominated by the most reduced portions (near the surface) of the wafer, the resistivities are typically dominated by the least reduced portions (in the bulk). Due to differences between reduction profiles across the wafers, the optical transmission and the resistivity not necessarily indicate the same amount of reduction for a particular sample when compared to those of other samples in Table 1.

Furthermore, the resistivity of an LT crystal is highly frequency dependent, and Table 1 specifies the resistivity values for a frequency of 1 mHz (milliHertz). Such frequency values are typically relevant to surface charging effects that happen during a few hours. For the reduced samples, a decrease in undesired charging effects were observed if the resistivity values were below about $5 \times 10^{14}$ Ohm cm, and the charging effects were substantially decreased if the resistivity values were below about $3 \times 10^{14}$ Ohm cm, such as below about $1 \times 10^{14}$ Ohm cm. The preconditioned wafers were substantially free of undesired charging effects if the resistivity values were below about $0.5 \times 10^{14}$ Ohm cm.

As illustrated by Table 1, both the optical transmissions and the resistivities indicate successful reduction of the LT wafers. The LT wafers' optical transmissions and resistivities decreased compared to the unreduced wafer for each of the listed active chemicals. Therefore, each of these active chemicals can contribute to chemically reducing the LT wafer. For some of the active chemicals, LT wafers were effectively reduced at processing temperatures that are well below the ferroelectric transition temperature of LT, which is about 600 Celsius. For example, the LT wafer was effectively reduced at about 250 Celsius using LiH, or above 400 Celsius using $CaH_2$.

TABLE 1

| Active chemical | Processing temperature (Celsius) | Processing time (hours) | Optical transmission (%) | Resistivity at 1 mHz ($10^{14}$ Ohm cm) |
|---|---|---|---|---|
| $Li_2CO_3$ | 580 | 5 | 13.5 | 0.019 |
| $Li_2CO_3$ | 560 | 6 | 67.0 | 0.29 |
| $NaHCO_3$ | 580 | 5 | 15 | 0.0073 |
| $K_2CO_3$ | 580 | 5 | 45 | 0.025 |
| $CaCO_3$ | 580 | 5 | 99 | 2.04 |
| $MgCO_3$ | 580 | 5 | 93 | 1.12 |
| $CaH_2$ | 580 | 5 | 24 | 0.154 |
| $CaH_2$ | 400 | 5 | 97 | 3.5 |
| LiH | 250 | 5 | 30 | 1.15 |
| Not treated | N/A | N/A | 100 | 11.0 |

An exemplary experiment for $Li_2CO_3$ is described below in detail. A film including $Li_2CO_3$ was deposited on the LT wafers using a dispersion (slurry). To prepare the dispersion, lithium carbonate powder of 99.99% purity was sifted through a 325-mesh size sieve. The dispersion was prepared by adding 1.0 gram of the lithium carbonate powder to each 5 ml of liquid matrix. The liquid matrix was a solution of sodium n-dodecyl sulfate (SDS) in water prepared by using a ratio of 1 gram of SDS for 10 ml of water. The addition of SDS increases the viscosity of the dispersion, slows down undesired settling of the suspended lithium carbonate, and improves wetting of the wafer surface.

The LT wafers had been cut, edge-rounded, lapped and etched in HF solution for 100 minutes at 28C before depositing the film. The LT wafers were positioned on a chuck of a spin-coating machine, such as commonly used for semiconductor processing. About 4 ml of the slurry was dispensed at a spin rate of 400 rpm. The spin rate was then ramped up to a speed of 2000 rpm to evenly distribute the slurry. With this procedure, the wafer surface dried within a convenient time frame at a room or slightly elevated temperature. Thus the wafers could be further processed without a danger of re-distribution of the chemicals on the surface. The coated wafers were loaded into a quartz processing boat that is commonly used in semiconductor processing, and the quartz boat was loaded into a horizontal tube reduction furnace. Although the loading was done manually at room temperature in the furnace, the loading process can easily be automated and the furnace can be preheated to a processing temperature.

After loading the wafers, a process gas was introduced into the furnace at a flow rate of 0.75 l/min. The process gas included 3.5% $H_2$ and 96.5% $N_2$. The furnace was heated to 560° C. at a rate of 5 K/min, and held at this temperature for 6 hours. Next, the furnace was shut off to let the furnace cool. Within 6 to 8 hours after switching off the power, the furnace core temperature fell below 80° C. Then, the process gas was switched off, the furnace was opened, and the wafers were unloaded. The processed wafers showed a grey color and had increased bulk conductivity. The wafers were rinsed, lightly lapped and polished. Such preconditioned wafers were successfully used to produce SAW filters, without any process induced charging effects.

Without being bound by any particular theory, the present inventors suggest that the active chemical ($Li_2CO_3$ in the above example) mediates a reaction between the LT substrate and the gaseous hydrogen in the atmosphere. According to this suggestion, the reduction includes a reaction between ambient hydrogen and the carbonate salt, and provides an in-situ generation of an active hydride intermediate (LiH):

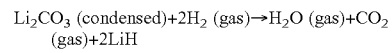

$$Li_2CO_3 \text{ (condensed)} + 2H_2 \text{ (gas)} \rightarrow H_2O \text{ (gas)} + CO_2 \text{ (gas)} + 2LiH$$

The in-situ generated hydride then reduces the LT substrate in a subsequent reaction. Alternative or additional chemical reactions can also contribute to reducing the LT substrate.

The invention has been described in terms of particular embodiments. Other embodiments are within the scope of the following claims. For example, the steps of the invention can be performed in a different order and still achieve desirable results.

What is claimed is:

1. A method for preconditioning a lithium niobate or lithium tantalate crystal, the method comprising:
   covering at least a portion of a surface of the crystal with a condensed material including one or more active chemicals selected from the group consisting of sodium bicarbonate, potassium carbonate, calcium carbonate, calcium hydride, magnesium carbonate, lithium hydride and lithium carbonate, and combinations thereof;
   heating the crystal in a non-oxidizing environment above an activating temperature at which the active chemicals contribute to reducing the crystal beneath the covered surface portion; and
   cooling the crystal from above the activating temperature to below a quenching temperature at which the active chemicals become essentially inactive for reducing the crystal.

2. The method of claim 1, wherein reducing the crystal includes reducing the crystal by a reducing reaction in which one or more of the active chemicals participate.

3. The method of claim 2, wherein the reducing reaction includes a plurality of chemical reactions and at least one active chemical participates in a chemical reaction in the plurality of chemical reactions.

4. The method of claim 1, wherein the active chemicals contribute to reducing the crystal by accelerating the reduction of the crystal.

5. The method of claim 1, wherein one or more active chemicals include sodium bicarbonate, calcium hydride, lithium hydride, or lithium carbonate.

6. The method of claim 5, wherein one or more active chemicals include lithium hydride or lithium carbonate.

7. The method of claim 6, wherein one or more active chemicals include lithium hydride.

8. The method of claim 1, wherein:
   covering the surface portion with a condensed material includes covering the surface portion with a condensed material including an inactive component that does not contribute to reducing the crystal at the activating temperature.

9. The method of claim 1, wherein:
covering the surface portion with a condensed material includes depositing a thin film of the condensed material onto the surface portion.

10. The method of claim 9, wherein:
covering the surface portion with a condensed material includes depositing the condensed material by condensation onto the surface portion.

11. The method of claim 10, wherein:
depositing the condensed material by condensation onto the surface portion includes depositing the condensed material during the heating of the crystal in the non-oxidizing environment.

12. The method of claim 10, wherein:
depositing the thin film includes physical vapor deposition of the condensed material onto the surface portion.

13. The method of claim 9 wherein:
depositing the thin film includes spin coating the surface portion with the condensed material.

14. The method of claim 9, wherein:
depositing the thin film includes dip coating the surface portion with the condensed material.

15. The method of claim 1, wherein:
covering the surface portion with a condensed material includes covering the surface portion with a powder of the condensed material.

16. The method of claim 1, wherein:
covering the surface portion with a condensed material includes preparing a solution or dispersion by dissolving or dispersing the active chemicals in a liquid matrix, respectively, and spinning the solution or dispersion onto the surface portion.

17. The method of claim 1, wherein:
heating the crystal above an activating temperature includes heating the crystal to a temperature that is below a ferroelectric phase transition temperature of the crystal.

18. The method of claim 1, wherein:
heating the crystal above an activating temperature includes heating the crystal above about 250 Celsius.

19. The method of claim 1, wherein:
heating the crystal in a non-oxidizing environment includes heating the crystal in a reducing atmosphere.

20. The method of claim 1, wherein:
heating the crystal in a non-oxidizing environment includes heating the crystal in an inert atmosphere.

21. The method of claim 1, wherein:
heating the crystal above an activating temperature includes keeping the crystal above the activating temperature during a predetermined activating time.

22. The method of claim 21, further comprising:
determining the activating time based on the active chemicals in the condensed material.

23. The method of claim 21, wherein:
cooling the crystal from above the activating temperature below a quenching temperature includes cooling the crystal from above the activating temperature below a quenching temperature within a quenching time that is smaller than the activating time.

24. The method of claim 1, wherein the crystal is a crystal wafer.

* * * * *